Jan. 16, 1962     H. C. PAUL     3,016,965
SNOW TRACTOR
Filed March 21, 1960     2 Sheets-Sheet 1
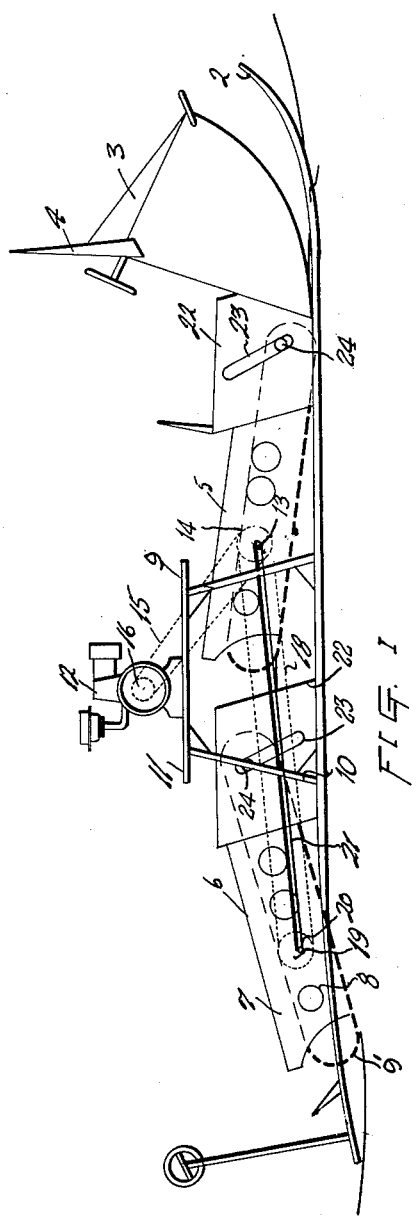
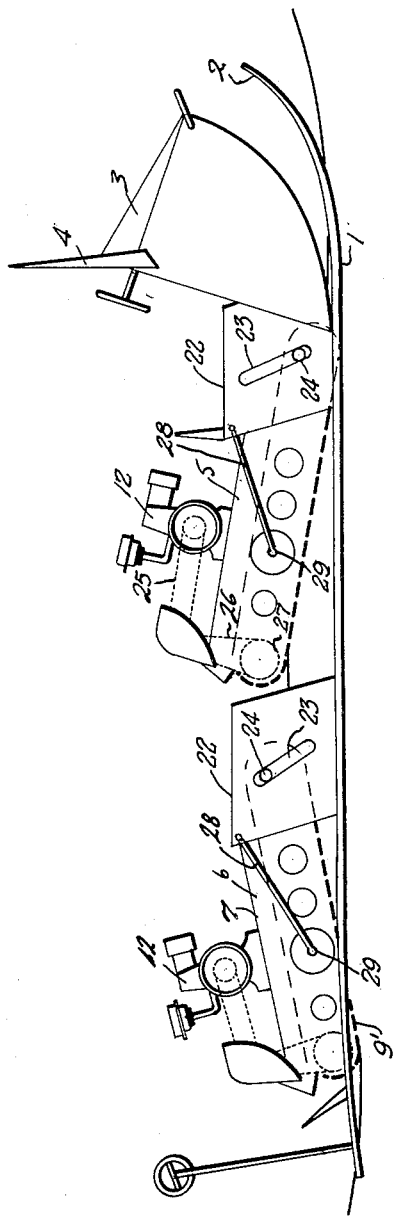
INVENTOR
HARRY C. PAUL
HIS ATT'YS

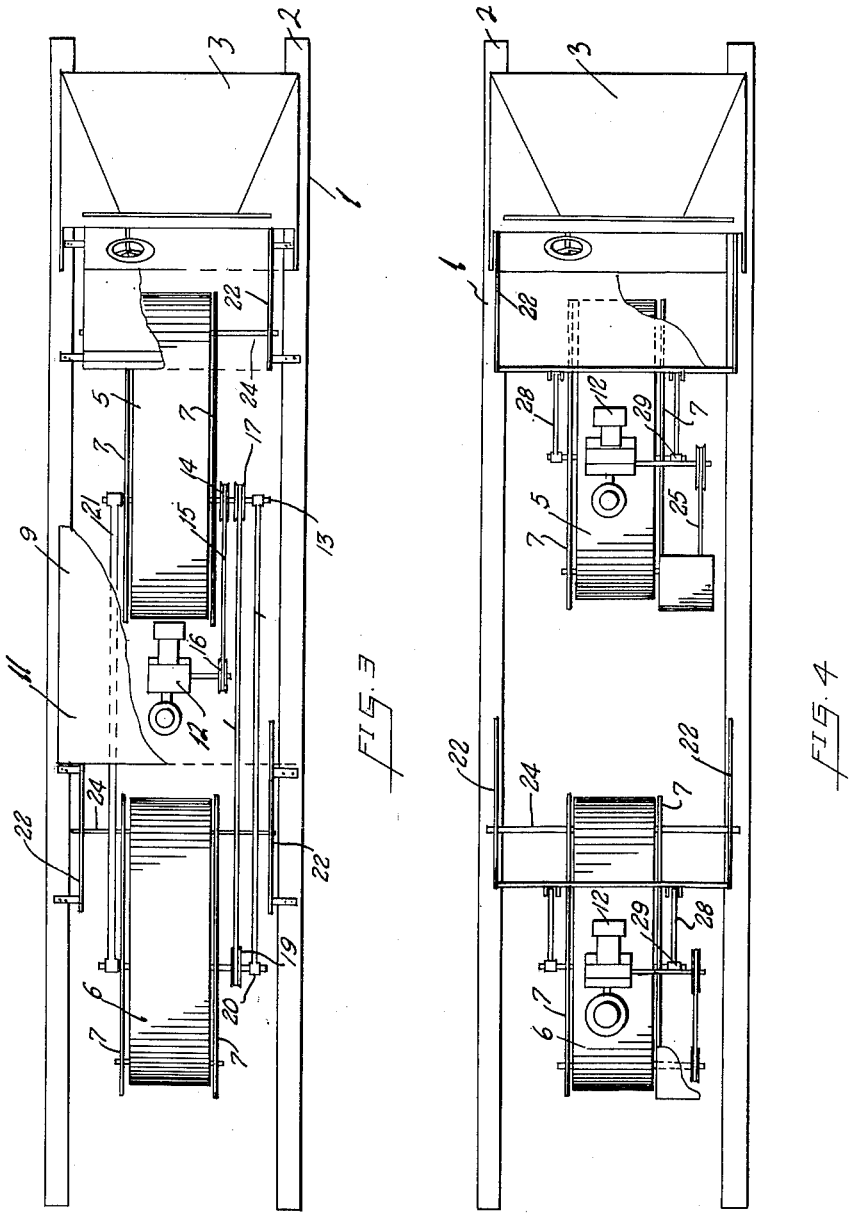

3,016,965
SNOW TRACTOR
Harry Charles Paul, 153 Oxford St., Winnipeg, Manitoba, Canada
Filed Mar. 21, 1960, Ser. No. 16,456
4 Claims. (Cl. 180—5)

My invention relates to new and useful improvements in snow tractors and the like. The majority of snow tractors at present in use, are perfectly satisfactory when travelling over relatively smooth surfaces but due to the rigidity of the power unit and drive means of these tractors, it will be appreciated that when the device is used on uneven ground, only part of the traction portion is engageable at one time thus giving rise to considerable difficulty in obtaining the necessary traction and developing the full power of the power unit. This is also most efficient when operating over deep snow conditions.

Furthermore, with relatively rigid structure, considerable strain is imparted to the structure when heavily loaded, particularly when used upon even surfaces.

I have overcome these disadvantages by providing a pair of spaced and parallel flexible runners having a plurality of traction units situated one behind the other and adapted to follow the contour of the land relatively closely.

The principal object and essence of my invention is therefore to provide a device of the character herewithin described which enables a greater degree of traction to be obtained with a given source of power.

A further object of my invention is to provide a device of the character herewithin described in which the tractive units operate independently one from the other insofar as the following of the terrain is concerned.

A yet further object of my invention is to provide a device of the character herewithin described which eliminates the considerable stresses from the superstructure which occurs in normal devices of this type.

Yet another object of my invention is to provide a device of the character herewithin described in which the runners can operate on a different level than the power units, a condition which often occurs when devices such as this are used on uneven snow covered terrain, or under conditions of deep snow.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a side elevation of one embodiment of my device.

FIGURE 2 is a side elevation of an alternative embodiment of my device.

FIGURE 3 is a top plan view of FIGURE 1.

FIGURE 4 is a top plan view of FIGURE 2.

In the drawings like characters of reference indicate corresponding parts in the different figures.

Proceeding therefore to describe my invention in detail, reference should be made to the accompanying drawings in which I have illustrated a pair of elongated spaced and parallel flexible runners 1 having upturned forward ends 2 in the conventional manner.

Cab structure 3 is secured to the runners and spans the runners adjacent the forward ends thereof, said cab structure including seat means (not illustrated) for the operator and also the necessary controls together with a windshield 4.

Situated between the runners 1 and rearwardly of the cab structure 3 is a pair of endless track power units 5 and 6, situated one behind the other. These endless track units are of relatively conventional construction inasmuch as they consist of side plates 7 carrying a plurality of rollers 8 over which is situated an endless track 9' of conventional construction.

Dealing first with the embodiment illustrated in FIGURES 1 and 3, I have provided a super-structure 9 consisting of legs 10 secured to and extending upwardly from the runners approximately medially along the length thereof, said legs being spanned at the upper ends thereof by means of the motor platform 11.

A conventional source of power such as a gas engine 12 is mounted upon platform 11 and controls may be extended to the cab unit 3 for the convenience of the operator.

One of the aforementioned rollers 8, preferably situated between the ends of each of the power units 5 and 6, includes shaft 13 which extends beyond the side plates 7 and upon this shaft is a sprocket wheel 14. A chain 15 extends around the sprocket wheel and around a corresponding sprocket 16 upon the source of power 12.

Also upon each end of shaft 13 is a further sprocket wheel 17 around which a further chain 18 extends. This chain passes around a sprocket wheel 19 situated upon the extension ends of shaft 20 which is mounted upon the rear power units 6 in a manner similar to that hereinbefore described for the power unit 5.

From the foregoing it will be appreciated that power from the engine 12 extends to the front power unit 5 and then rearwardly to the rear power unit 6.

In order to maintain the correct spacing between sprockets 17 and 19, I provide a rigid link 21 pivotally secured by each end thereof to the shafts 13 and 20 one upon each side of the two power units.

Each of the power units is mounted for limited vertical movement within the snow tractor and this is provided by means of plates 22 secured to each runner and extending upwardly therefrom, it being understood that there is a pair of plates for each power unit in spaced and parallel relationship one with the other.

Each of these plates is provided with a diagonal slot 23 formed therein, said slots inclining upwardly and rearwardly from the runners 1.

A shaft 24 extends through the front end of each of the power units and extends upon each side thereof so that the ends of the shaft 24 engage within the slots 23.

In FIGURES 2 and 4, I have shown my preferred embodiment in which the source of power 12 is mounted upon each of the units 5 and 6, drive from the source of power passing through chains 25 and 26 to sprockets 27 situated at the rear of each unit.

The mounting of the units 5 and 6 between the runners 1, is carried out in a similar manner to that hereinabove described so consequently similar reference characters have been given the relevant structure.

However it is necessary to provide radius rods 28 extending between each of the units and the plates 22, these radius rods being pivotally secured adjacent the rear side of the plates and two axial extensions 29 of one of the endless track rollers.

In operation, it will be appreciated that the units can operate independently of one another insofar as elevation is concerned, the front end of the units being allowed to move vertically within the diagonal slots 23. The diagonal slots are important inasmuch as they permit the power units to develop their full thrust and prevent slippage occurring as it will be appreciated that the more thrust developed by each track, the further down move the shafts 24 in the slots 23 thus accentuating the grip characteristics of each track upon the surface.

It will be appreciated that full thrust can be developed within the minimum of power irrespective of the terrain over which the device is operating.

I have found that, under conditions of deep snow, the front unit breaks trail and the rear unit supplies additional traction. In fact, I obtain increased traction with two units of combined horsepower less than a one unit device of this nature.

Finally, there is the safety factor of having a plurality of units particularly when used in remote locations. If one unit breaks down it can be jacked up clear of the runners and the other unit used for propulsion.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A snow tractor comprising in combination a pair of spaced and parallel flexible runners, cab structure spanning the forward portions of said runners, a plurality of endless track units situated one behind the other between said runners, and means supported by said runners for mounting the front ends of said units for limited vertical movement therein, said means mounting said units for limited vertical movement comprising a plate secured to and extending upwardly from each of said runners and adjacent the front end of each of said units, each plate being diagonally slotted, a mounting shaft extending transversely upon each side of said unit adjacent the front end thereof, the ends of said shafts engaging said diagonal slots.

2. The device according to claim 1 which includes radius rods extending between each of said units and said mounting means, one upon each side thereof, said radius rods being pivotally secured to said units and said mounting means.

3. The device according to claim 1 which includes a source of power for said units operatively connected therewith.

4. The device according to claim 2 which includes a source of power for said units operatively connected therewith.

References Cited in the file of this patent

UNITED STATES PATENTS

| | | |
|---|---|---|
| 1,069,761 | Buckley | Aug. 12, 1913 |
| 1,392,688 | Kegresse | Oct. 4, 1921 |
| 2,323,526 | Eliason | July 6, 1943 |